Oct. 10, 1961      J. F. LISTON      3,003,786
SAFETY TRAY FOR VEHICLES
Filed Sept. 30, 1959      4 Sheets-Sheet 1
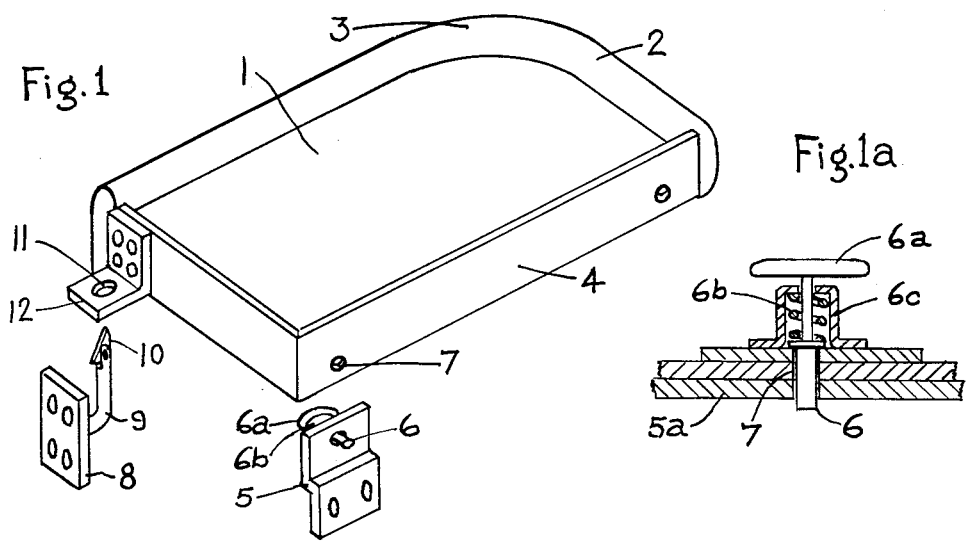
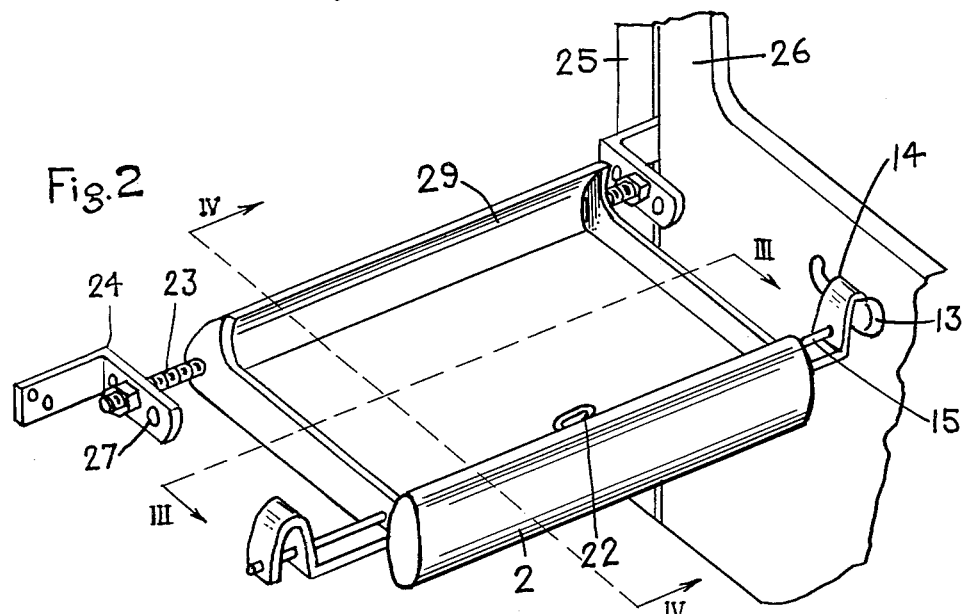
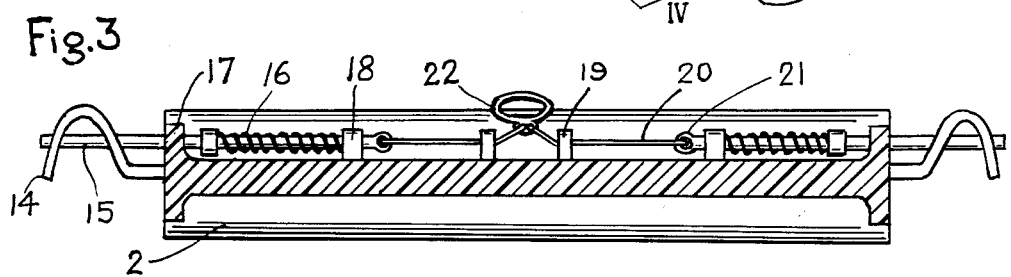

Oct. 10, 1961  J. F. LISTON  3,003,786
SAFETY TRAY FOR VEHICLES
Filed Sept. 30, 1959  4 Sheets-Sheet 2
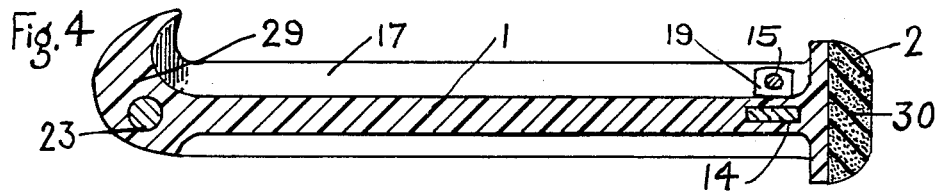
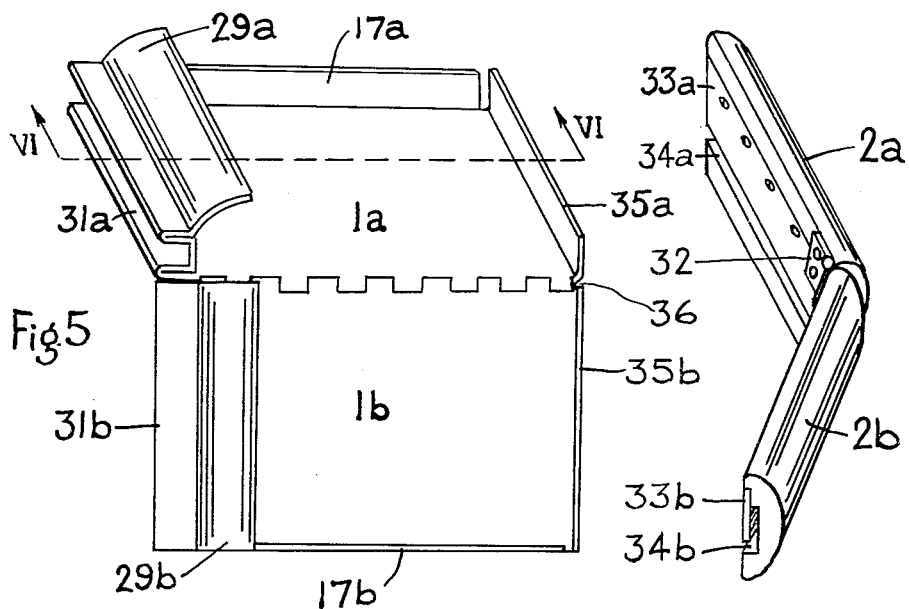
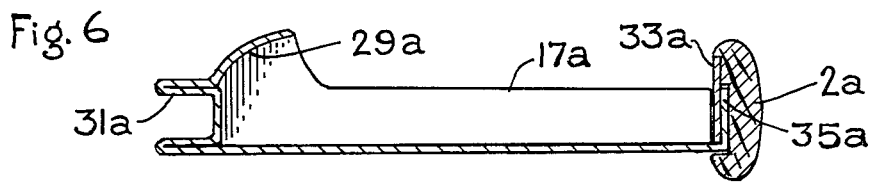
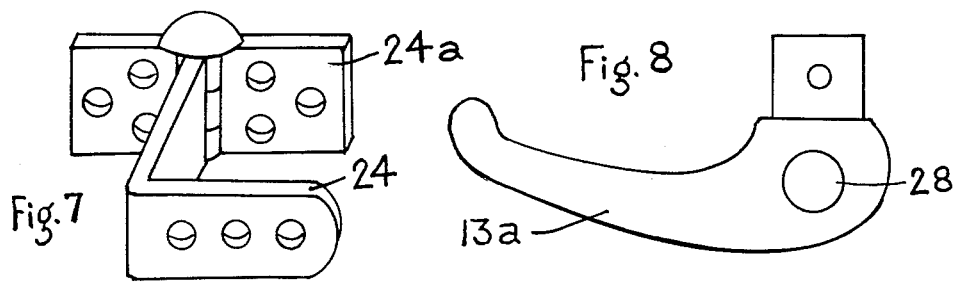

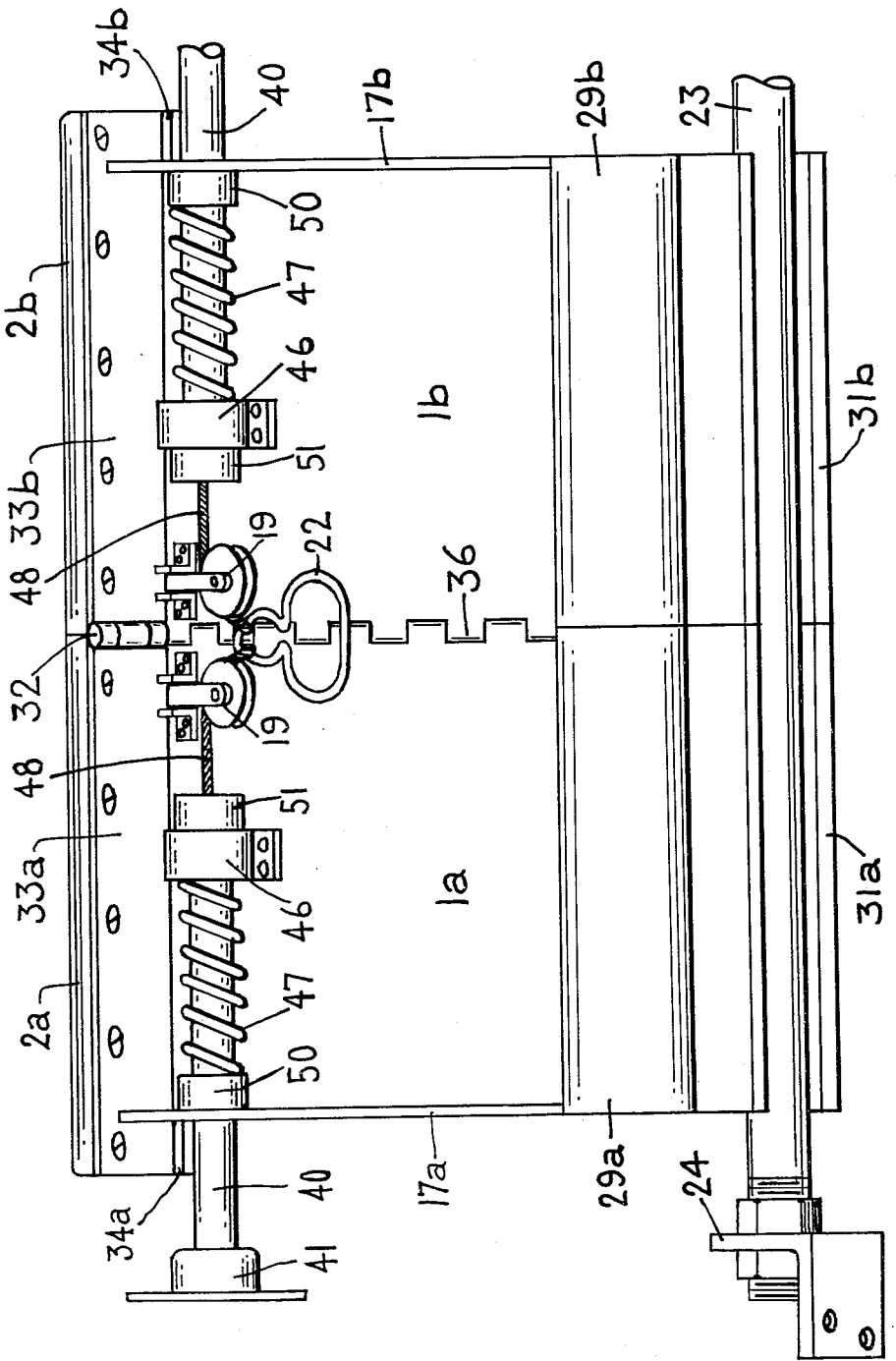

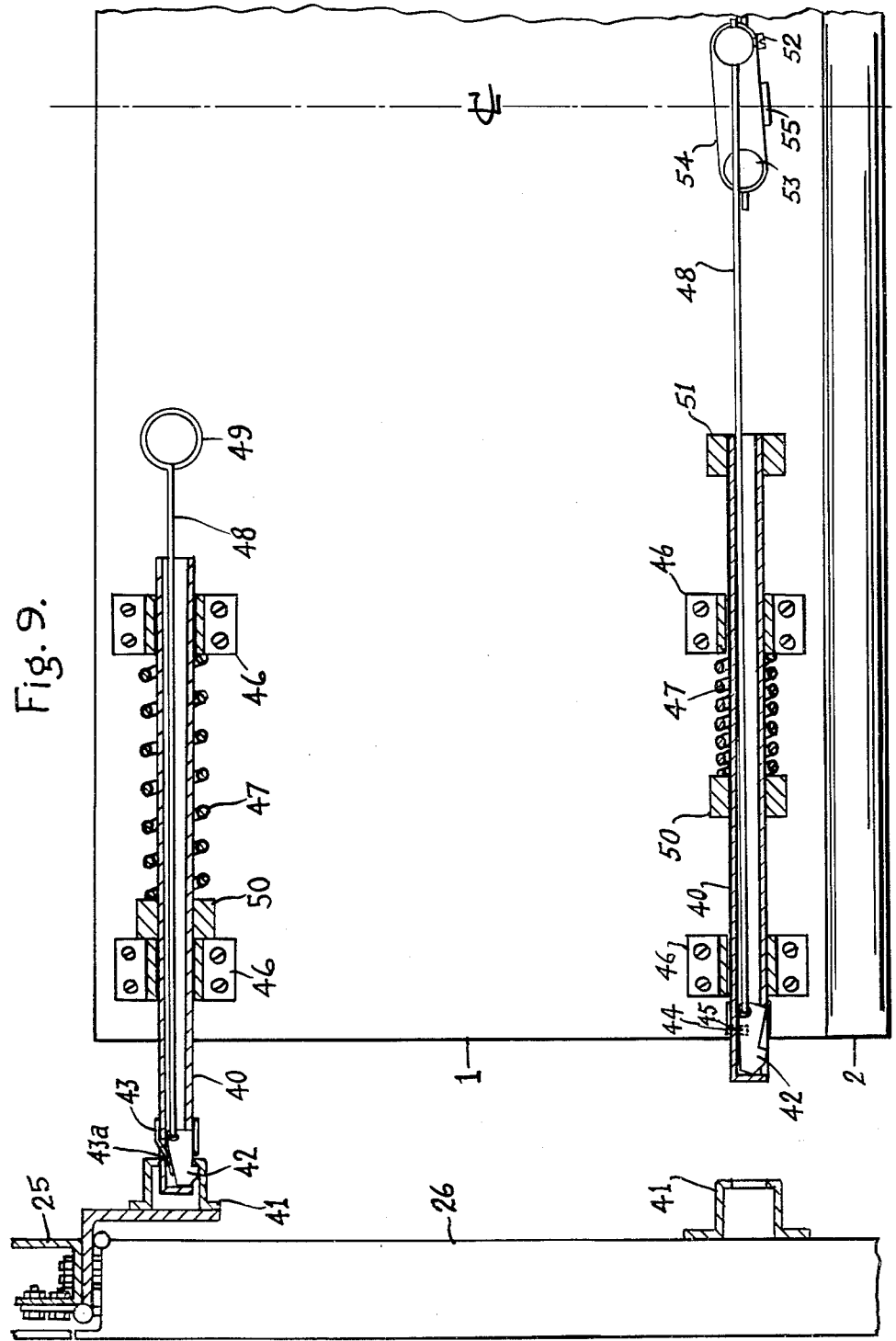

3,003,786
SAFETY TRAY FOR VEHICLES
James Frederick Liston, 20 Findlay Ave.,
Ottawa, Canada
Filed Sept. 30, 1959, Ser. No. 843,511
18 Claims. (Cl. 280—150)

This invention comprises a dual purpose vehicle accessory, which combines the functions of a car tray and a crash bar, and also, by virtue of its attachment to the rear doors of a sedan, prevents these doors from being opened accidentally by children, and, depending upon the type of attachments used, may also suffice to prevent such opening in the event of collision or upset.

In its simplest form, the invention comprises a rigid tray about a foot and a half deep and somewhat narrower than the interior of the vehicle it is intended to fit, so that it will not foul the window winders. This tray is attached to the centre door posts of a sedan, for example, either by detachable mounts so that it may be removed for storage or by permanent pivotal mounts so that it may be rotated to a vertical position to allow passengers to enter or leave. The preferred variant combines both advantages, having a heavy bar permanently attached between the door posts and the tray adapted to snap on and off in pivotal engagement. When the rear seat passengers are seated, the tray is positioned with its heavily padded rear edge closely adjacent to their midriffs, and the rear corners are then locked to the rear doors. In a preferred variant, the door mount locks are controlled by a common handle in a central position, the same handle serving to raise the tray to vertical position. A smaller variant for the front seat may be attached to the dash at two spaced points or along the entire front edge and locked to the passenger's door as in the rear seat variant. A light, cheap variant recommended only as a safety device for children may be designed to engage the rear inside door handles or pulls or modified door handles or pulls designed to co-operate with the rear mounts. A variety of materials are suitable for the tray, which may be designed for forming out of sheet metal, plywood, or moulded metal or thermosetting plastic, as shown in the following specification and drawings.

In the drawings:
FIG. 1 is a perspective view of a front seat variant.
FIG. 1a is a sectioned view of the dash bracket of FIG. 1.
FIG. 2 is a perspective view of a rear seat variant.
FIG. 3 is a cross section of FIG. 2 at line III—III.
FIG. 4 is a cross section of FIG. 2 at line IV—IV.
FIG. 5 is a perspective view of a foldable variant.
FIG. 5a shows the variant of FIG. 5 complete with mounts.
FIG. 6 is a cross section of FIG. 5 at line VI—VI.
FIG. 7 is a perspective view of a modified door hinge.
FIG. 8 is a plan view of a modified inside door handle, and FIG. 9 is a view from below of a tray with preferred mounts.

The safety tray of FIG. 1 illustrates the basic principle of the invention, which is to detachably lock at least one door and a padded tray firmly together with a part of the bar body other than the door. The flat tray 1 has an enlarged padded edge 2; in the front seat variant the corner next to the driver is rounded and padded as shown at 3, in case the driver were to be thrown sideways against the tray. Primarily the tray is intended to protect the front seat passenger or passengers, since they usually suffer more injuries than the driver, who is braced by holding the steering wheel. By example only, the tray is shown adapted to be mounted by its depending flange 4 in brackets 5 fixed to the dash 5a and locked in place by spring loaded pins 6 engaging holes 7 in flange 4. FIG. 1a shows the details of pin 6, including knob 6a, spring 6b, housing 6c, and collar 6d, in locked position. Bracket 8 is firmly attached to the front door on the passenger's side and includes a heavy pin 9 with a suitable lock 10 positioned to engage hole 11 in bracket 12 on the tray. Obviously, many equivalent mountings could be substituted, the only requirement being that they should be easily releasable by hand and yet strong and shock resistant when engaged.

FIG. 2 illustrates a pivoted rear seat safety tray suitable for use in sedans. The mountings shown were found to be suitable for a sedan, in which the device was tested. The door handles 13 are positioned just right for supporting the tray by simple bars of inverted U form indicated as 14 in FIG. 2. Locking rods 15 are spring loaded into locking position below the door handles, as shown in detail in FIG. 3, by springs and are a sliding fit in the two aligned holes in each U-shaped bar 14, holes in web 17 and in bosses 18, which form abutments for springs 16, and are attached to the tray or may form an integral part of a moulded variant. Bosses 19 are similar to bosses 18 and through them pass cables 20 attached to rods 15 by any suitable means 21 and to common handle 22 between bosses 19. An upward pull on handle 22 retracts both locking rods simultaneously, and a further upward pull on the same handle serves to raise the tray to a vertical position.

At the front of the tray, using the terms front and rear in the same sense as in referring to the vehicle, a heavy rod 23 passes through the tray transversely and is attached to a pair of heavy angle iron sections 24, which in turn are attached to the centre door posts 25 by suitable fasteners such as bolts or self threading metal screws. It should be noted that these fasteners are not called upon to resist very much of a shock in the event of a collision, as the closing of doors 26 clamps them solidly into position as well as resisting withdrawal of the bolts or screws. Angles 24 are provided with extra holes 27 to give a choice of positions for the tray. FIG. 7 shows a stronger variant suitable for installation at the factory. It is found that the most suitable point of attachment for angle 24 coincides with the position of the top door hinge 24a and so the logical way to make a very strong assembly is to form angle 24 integral with this hinge, or to weld it on securely. FIG. 8 shows a possible modification of a door handle which would provide a stronger rear attachment than the variant of FIG. 2. Modified handle 13a would be made of stronger metal than the usual handles, possibly forged steel, but would attach to the door in the usual way and could be provided, for example, with a hole 28 to receive a pin of the sort illustrated in FIG. 1 indicated as 9 with lock 10, on the tray. This mount would prevent the handle from turning.

A valuable addition to the pivoting tray is the trough indicated as 29 in the drawings. Especially when the tray is littered with children's crayons, coloring books, puzzle pieces, etc., it is a convenience not to have to clear the tray whenever it must be pivoted to vertical position.

FIG. 4 shows a sectional view of the tray of FIG. 2. It will be noted that bar 14, which forms the U-shaped mounts for the doors, is moulded into the thermoplastic or thermosetting plastic of the tray. The plastic may be reinforced with fiberglass, and should have sufficient rigidity to transmit compressive shock forces to the heavy rod 23, which can be mounted much more strongly than bar 14. Webs 17 help in giving the tray rigidity, as well as serving as retaining edges on the tray. A similar design would be suitable for casting out of light metal alloys or aluminum.

Enlarged edge 2 is shown in FIG. 4 as padded at 30 with sponge rubber, although it must be realized that the value of sponge rubber as a shock absorbing material is questionable, due to its very fast memory. A more suitable material is butyl rubber, and even cotton batting is considered to be better than sponge rubber. Polystyrene foam, ground cork, or balsa wood are other shock absorbing materials but the material selected should be resistant to light shocks, so that normal rough use by children or bumps caused by sudden braking will not cause permanent damage. One of the more recent developements in shock absorbers is aluminum honeycomb core material, and it is quite conceivable that the entire tray could be formed of this new material, so that in the event of a very bad crash, progressive collapse of the whole tray would decelerate the passengers over a much longer interval. If such progressive collapse of the tray is planned, bar 14 cannot be used, since it would probably injure the passengers, depending on how well it is anchored by the door mounts. Bar 14, of course, need not have the form illustrated, and could be, for example, a light structural T with the flange to the rear.

An important variant of this invention, then, is a safety tray designed to cushion the shocks caused by sudden braking by the padded enlarged edge which is contacted immediately by the rear seat passengers, without damage to the tray, which is still usable. However, in the event of a head-on collision, when the salvaging of accessories is unimportant compared to the saving of the lives of the passengers, the tray is intended to absorb a far greater amount of the energy released by decelerating the passengers by collapsing in concertina fashion.

In a violent crash, the heavy front mounts joined by a strong steel rod must be relied upon much more than the relatively weaker rear mounts on the doors, which are mainly relied upon to steady the tray against any tendency to rotate about the rod. If the entire tray is made of aluminum honeycomb core material or other material suitable for abserbing relatively large shocks, it is conceivable that an immediate severing of the tray from the door mounts would allow this unwanted pivoting, thereby reducing the effectiveness of the tray. To remedy this defect, webs 17 could be of a relatively stronger material than the main body of the tray and instead of the door mounts being integral with the rear edge reinforcing bar as shown heretofore these mounts would only be attached to webs 17. The bar could be omitted from the rear edge or if included would not extend to webs 17. In the aluminum honeycomb variant, it might be advisable to form webs 17 as a pair of inwardly directed channels or T-slotted bars and to form the rear edge reinforcement bar with ends adapted to co-operate with the tracks provided by these webs. This would ensure that the collapsing material of the tray would be "scooped in" by the advancing rear edge instead of being deflected out of line.

Although omitted from the drawings for clarity, springs may be included to counterbalance the tray or to snap it to vertical position or to both horizontal and vertical positions either way from a "dead spot" as well known in the automotive art.

FIG. 5 shows a sheet metal variant of the safety tray, and is designed to be readily removable and compact for storage. The tray is divided into sections 1a and 1b joined by a piano type hinge 36 which may be formed integrally with the tray sections. The lower surfaces of the tray sections are flat so that the tray may be folded downwards for storage. The enlarged rear edge is separable from the tray and is itself foldable about hinge 32. Edge sections 2a and 2b have L-shaped grooves 34a and 34b adapted to receive the rear flanges 35a and 35b of the tray in sliding engagement. For convenience in construction, the grooves are shown as completed by the addition of plates 33a and 33b, but this design is optional. This variant would be particularly suitable for using a solid edge of balsa wood as shock absorbent material. When the tray sections are unfolded and slid into the grooves in the edges a very rigid assembly is achieved, the hinging of the two parts being at right angles and so not weakening the structure.

Integrally formed with the tray sections and troughs 29a and 29b are channels 31a and 31b which are so proportioned as to be a snap fit onto rod 23. Flanges 17a and 17b reinforce the ends of the channels, as shown more clearly in FIG. 6, which is a cross-section of the assembled tray at lines VI—VI of FIG. 5, and also abut plates 33a and 33b which are a sliding fit between the side and rear flanges.

The above embodiments are shown by way of example, and suitable equivalents may be substituted wherever advisable. For example, rod 23 is shown threaded, and may be threaded into the tray as an alternative to moulding in. In a metal variant, a pair of rods 23 may be screwed into threaded holes in the tray or in a pipe welded into a sheet metal variant. Such a variant would be suitable for a kit to fit a variety of cars, since it could be installed by a motorist without sawing a single rod 23 to size. The addition of game insignia, depressions for tumblers, ash trays, etc. is well known in car trays, and would not change the nature of the invention.

FIG. 9 is a view of the bottom of a tray with a preferred type of attachment for light duty. Due to the slope in modern car doors, attachments of the kind described heretofore will foul the upper part of the door when the tray is rocked up. The attachments of FIG. 9 may be retracted sufficiently to avoid this trouble and fixed in this position by a small overthrow of the central handle.

Tubular members 40 on the tray are slidable into sockets 41 on the car and are locked there by spring urged locks 42. Similar attachments are shown mounting the trap pivotally on door post 25 and on door 26, the front attachment shown fully engaged and locked and the rear attachment fixed in fully retracted position. Locks 42 are held in slots in tubes 40 by spring clips. Clip 43 has an integral finger 43a which is inserted through a hole in tube 40 to urge lock 42 into locking engagement with the lip of socket 41. The rear mount is shown with a plain clip 44 retaining lock 42 in its slot, locking pressure being provided by an internal spring 45.

Control rods 48 hook into holes in locks 42 so that a pull on the control rod will rock the attached lock about the end of its slot and disengage it from its socket 41, allowing the tube 40 to be withdrawn from the socket. The front control rods may be provided with simple individual handles such as loop 49. Any of the variants previously described may be used at the front of the tray, but the socket and tube mount allows the tray to be removed completely when not in use leaving only the pair of sockets attached to the car.

Tubes 40 are mounted slidably in blocks 46 which are attached to the bottom of the tray and are urged into engagement with sockets 41 by springs 47 acting on collars 50. These collars also resist any sliding of the tubes beyond the position in which they lock to the sockets, by abutting outer blocks 46. Extra collars 51 may be provided to abut inner blocks 46 to double the strength of the assembly in resisting failure due to slipping of the tubes.

Rear control rods 48 are clamped by set screws 52 in pivots 53 in opposite ends of a bar 54 which is attached to the central handle (not shown) by an offset 55. In the position shown, the bar and handle assembly has been rotated to the limit of its travel counterclockwise, lock 42 has been pulled to its retracted position, and spring 47 is substantially fully compressed. Tube 40 is thereby fixed in its retracted position so that it will not foul the upper part of the car door when the tray is raised.

It has been found in use in the family car that a child who becomes tired will stretch out on the tray and go to sleep. This is a relatively safe position, since the child is close to the back of the front seat which will catch the child in the event of a quick stop. To facilitate such use of the tray, a pad may be provided of about the same dimensions as the top of the tray and attached near the rear edge. It may then be folded down over the padded edge to add to the padding during normal use of the tray, or may be spread out on top of the tray when a child wishes to sleep there. Such an addition has not been illustrated or claimed since it is not thought to be a patentable feature.

In the following claims, "a pad of shock absorbing material" is to be construed broadly to include any suitable shock absorbing edge such as the solid section of balsa wood or a contoured sheet metal edge designed to yield under impact loads less than those that would prove lethal to a human body.

The word "socket" is also to be construed broadly to include any member with a hole of a suitable size to be engaged by the tube and lock; for example front mounts could be of the form of angle sections 24 with a row of suitably sized holes offering a choice of locations.

I claim:

1. A combined tray, crash bar, and safety door lock for vehicles comprising a rod, means at both ends of said rod for attachment to a vehicle, a tray of relatively rigid material pivoted about said rod along a first edge of said tray, a crash bar comprising an edge of said tray opposite to said first edge, and a pair of vehicle door engaging means attached to said tray at the corners of said tray adjacent to said crash bar.

2. A combined tray, crash bar, and safety door lock for vehicles comprising a rod, angle members at the ends of said rod for attachment to the centre posts of a sedan, a tray of relatively rigid material pivoted about said rod along a first edge of said tray, a crash bar comprising an edge of said tray opposite to said first edge, and a pair of vehicle door engaging means attached to said tray at the corners of said tray adjacent to said crash bar.

3. A combined tray, crash bar, and safety door lock for vehicles comprising a rod, angle members at the ends of said rod secured on said rod by nuts threaded onto said rod, said angle members also being secured to the centre posts of a sedan, a tray of relatively rigid material pivoted about said rod along a first edge of said tray, a crash bar comprising an edge of said tray opposite to said first edge, and a pair of vehicle door engaging means attached to said tray at the corners of said tray adjacent to said crash bar.

4. A combined tray, crash bar, and safety door lock for vehicles comprising a rod, angle members at the ends of said rod secured on said rod by nuts threaded onto said rod, said angle members also being secured to the centre posts of a sedan on the surfaces of said centre posts adjacent to the rear doors, whereby said angle members will be clamped between said doors and said door posts when said doors are closed, a tray of relatively rigid material pivoted about said rod along a first edge of said tray, a crash bar comprising an edge of said tray opposite to said first edge, and a pair of vehicle door engaging means attached to said tray at the corners of said tray adjacent to said crash bar.

5. A combined tray, crash bar, and safety door lock for vehicles comprising a rod, angle members at the ends of said rod secured on said rod by nuts threaded onto said rod, said angle members also being secured to the centre posts of a sedan, a tray of relatively rigid material pivoted about said rod along a first edge of said tray, a crash bar comprising an edge of said tray opposite to said first edge, a pair of sockets attached to the rear doors of said sedan, and a pair of socket engaging means attached to said tray at the corners of said tray adjacent to said crash bar.

6. The invention defined in claim 5 wherein the said socket engaging means comprise retractable tubular members and lugs spring-loaded to lock said tubular members against withdrawal from said sockets.

7. The invention defined in claim 6, said spring-loaded lugs being attached to tension members attached to a central handle, whereby a pull on said central handle will first unlock said lugs, then withdraw said tubular members from said sockets, and finally will rotate said tray about said rod.

8. A safety tray for vehicles comprising a pair of rectangular sheets having upturned flanges along three edges and cooperating halves of a hinge along the fourth edge of each sheet, assembled by engaging said hinge halves to form an edged tray foldable downwardly about said hinge, a crash bar slidably engagable with one pair of adjacent upturned flanges whereby slidable assembly of the crash bar to the said flanges prevents any folding of the tray about said hinge, an outwardly opening channel member attached to each flange of the other pair of adjacent flanges for pivotal engagement with a rod mounted horizontally in a vehicle, and a pair of door engaging means attached to the corners of said tray adjacent to said crash bar.

9. The invention defined in claim 8, said last mentioned pair of flanges being extended upwardly and inwardly to form a trough for receiving articles on the surface of the tray when the tray is pivoted upwardly about said rod.

10. The invention defined in claim 9, said last mentioned pair of flanges, said channel members, and said trough being integrally formed from the same pair of rectangular sheets which comprise said tray.

11. The invention defined in claim 8, said crash bar being foldable about a hinge at right angles to the hinge of said tray, whereby slidable assembly of the crash bar to the tray renders both hinges incapable of folding.

12. The invention defined in claim 8, said crash bar comprising a slab of balsa wood.

13. The invention defined in claim 12, said slab of balsa wood being provided with an open channel to receive said upturned flanges of said tray, and a strip of material attached to said slab of balsa wood so as to partially close said channel and so convert it into an L-shaped slot.

14. A safety tray for vehicles comprising a pair of rectangular sheets having upturned flanges along three edges and cooperating halves of a hinge along the fourth edge of each sheet, assembled by engaging said hinge halves to form an edged tray foldable downwardly about said hinge, a crash bar slidably engageable with one pair of adjacent upturned flanges whereby slidable assembly of the crash bar to the said flanges prevents any folding of the tray about said hinge, an outwardly opening channel member included in each flange of another pair of adjacent flanges for pivotal engagement with a rod, said rod being mounted in a horizontal position by attaching each end of said rod to an opposite door post of a sedan, a pair of sockets attached to the rear doors of said sedan, and a pair of socket engaging means attached to said tray at the corners of said tray adjacent to said crash bar.

15. The invention defined in claim 14 wherein the said socket engaging means comprise retractable tubular members and lugs spring-loaded to lock said tubular members against withdrawal from said sockets.

16. The invention defined in claim 15, said spring-loaded lugs being attached to tension members attached to a central handle, whereby a pull on said central handle will first unlock said lugs, then withdraw said tubular members from said sockets, and finally rotate said tray about said rod.

17. The invention defined in claim 16, said crash bar being foldable about a hinge at right angles to the hinge of said tray, whereby slidable assembly of the crash bar to the tray renders both hinges incapable of folding.

18. The invention defined in claim 17, said crash bar comprising a slab of balsa wood provided with an open channel to receive said upturned flanges of said tray, and a strip of material attached to said slab of balsa wood so as to partially close said channel and so convert it into an L-shaped slot slidably engageable with said flange of said tray.

References Cited in the file of this patent
UNITED STATES PATENTS

| | | |
|---|---|---|
| 2,067,661 | Ferrelle | Jan. 12, 1937 |
| 2,674,486 | Alderfer | Apr. 6, 1954 |
| 2,749,143 | Chika | June 5, 1956 |
| 2,755,101 | Budde | July 17, 1956 |